June 10, 1924.                                                                1,497,010
W. H. GARTLEY ET AL
AUTOMATIC CONTROL WATER GAS SET
Filed Nov. 9, 1921                2 Sheets-Sheet 1
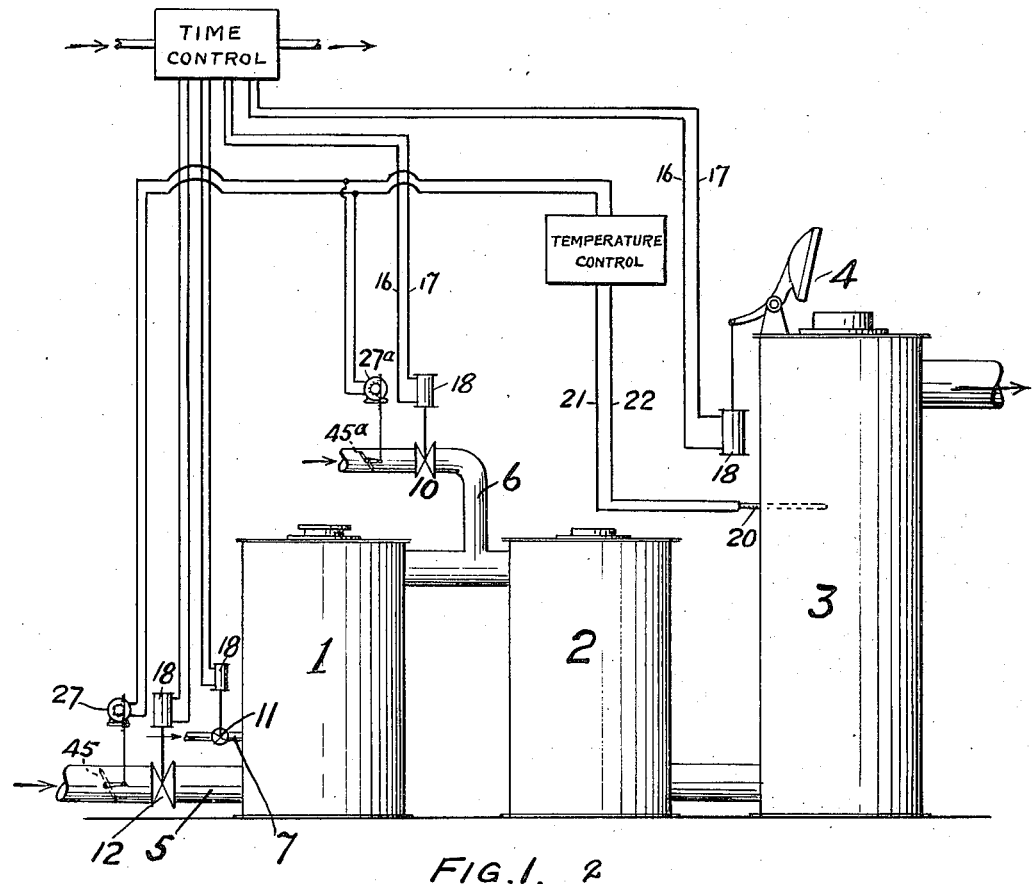
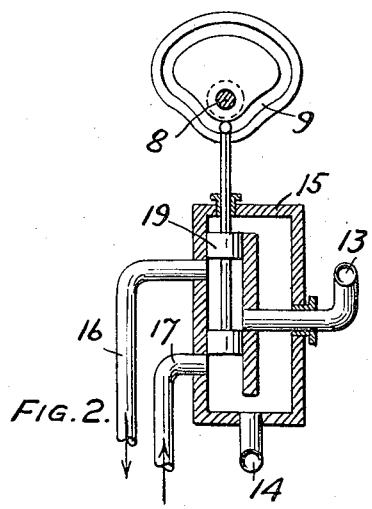
FIG.2.
WITNESS:
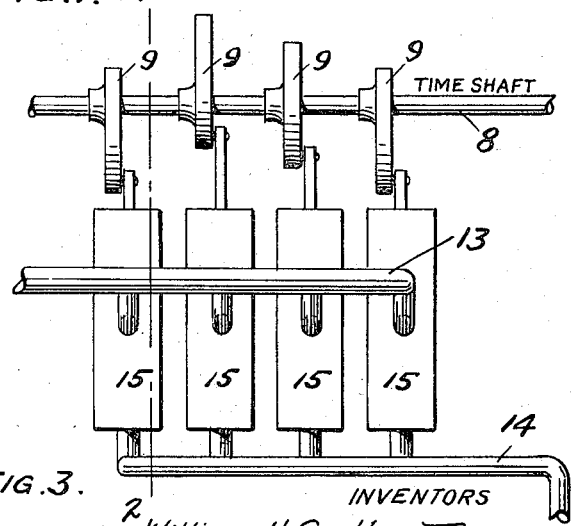
FIG.3.
INVENTORS
William H. Gartley and
Owen Brooke Evans
BY
ATTORNEY.

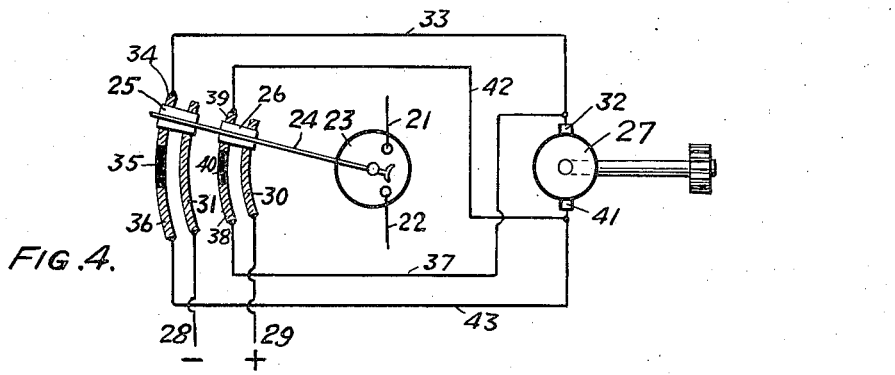
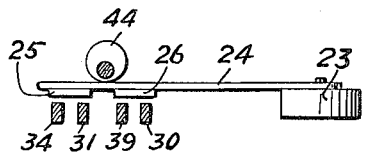
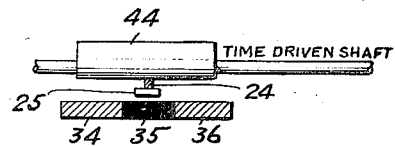
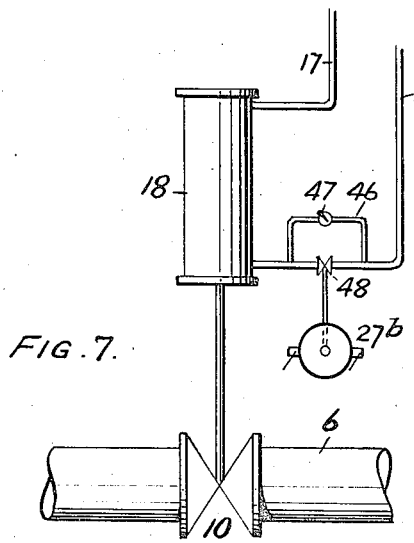
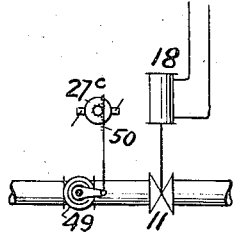

Patented June 10, 1924.

1,497,010

UNITED STATES PATENT OFFICE.

WILLIAM H. GARTLEY AND OWEN B. EVANS, OF PHILADELPHIA, PENNSYLVANIA, ASSIGNORS TO THE U. G. I. CONTRACTING COMPANY, OF PHILADELPHIA, PENNSYLVANIA, A CORPORATION OF DELAWARE.

AUTOMATIC CONTROL WATER-GAS SET.

Application filed November 9, 1921. Serial No. 513,884.

*To all whom it may concern:*

Be it known that we, WILLIAM H. GARTLEY and OWEN B. EVANS, citizens of the United States, residing at Philadelphia, in the county of Philadelphia and State of Pennsylvania, have jointly invented a new and useful Improvement in Automatic Control Water-Gas Sets, of which the following is a specification.

Automatic control water gas sets having time control mechanism normally functioning to actuate the apparatus valves at definite intervals of time for runs and blasts is well known and an example of one such apparatus is disclosed in Letters Patent No. 1,119,472, dated December 1st, 1914. In practice it has been found that on account of unavoidable variations in the character of the fuel bed due to the character and quantity of the ash and to other factors, the control of the set by operating the valves according to a definite time interval will not always produce a uniform temperature at that part of the apparatus at which the temperature should be regulated for the most efficient production of gas. Otherwise stated, varying fire and fuel conditions affect the heats in the set in such a way that time actuated controls for the runs and blasts do not always produce the best results.

One object of the present invention is to avoid the above mentioned defects and disadvantages and to automatically insure good results with time controlled mechanism regardless of the varying conditions of the fuel and fire. To these and other ends hereinafter set forth the invention, generally stated, comprises the combination in an automatic control water gas set having run and blast time control mechanism of means for varying the quantity of gas making fluid (generator air, carbureter air, or steam) in order to maintain uniform heats, and thermally responsive provisions adapted to cooperate with, control or actuate said means. The invention further comprises the improvements to be presently described and finally claimed.

In the following description reference will be made to the accompanying drawings forming part hereof and in which—

Figure 1 is an elevational view diagrammatically representing a water gas set and its time control, and schematically illustrating the temperature control cooperating with and auxiliary or supplementary to the time control.

Figs. 2 and 3 are a transverse section and an elevation drawn to an enlarged scale and illustrating in more detail the apparatus indicated in Figure 1 by the legend "Time control," Fig. 2 being a section taken on the line 2—2 of Fig. 3.

Figs. 4, 5 and 6 are top, sectional and end views illustrative of the apparatus indicated in Figure 1 by the legend "Temperature control," and Figs. 7 and 8 elevational views illustrating modifications in the valve gear.

In the drawings 1, 2 and 3 are the generator, carbureter and superheater, and the latter is shown equipped with a stack valve 4. 5 is the generator air connection, 6 is the carbureter air connection, and 7 is a steam connection. In one of its aspects the present invention involves the use of a time control for working the apparatus valves to effect runs and blows at intervals. While such time control for water gas sets is well understood it may be helpful to briefly refer to some of the parts of one type of such control, and this will be done for the sake of description and not with the intention of in any way limiting the present invention. The time control selected happens to be hydraulically operated because of the facility with which it can be illustrated or drawn. 8 is a time driven cam shaft having cams 9 which control the admission and exhaust valves for the cylinders which work the apparatus valves of which 10, 11 and 12 are examples. Since the admission and exhaust valves may be connected with a common inlet 13 and with a common outlet 14, a description of one of them will be sufficient. Each of these admission and exhaust valves 15 is connected by pipes 16 and 17 with the cylinder 18 that actuates an apparatus valve, and each of these valves 15 is provided with a slide valve 19 actuated from a cam 9. The foregoing description and illustration of time control for water gas sets are not intended for any purpose other than an explanation of the invention and for that reason they are reduced to their simplest form, but those skilled in the art will be enabled to understand or helped to understand the invention.

The temperature control will now be described in one form which will enable those skilled in the art to understand it but it will be stripped of details and refinements such as will suggest themselves without invention to those skilled in the art. 20 is a thermally responsive device. It is shown as a thermo-couple and it is arranged to be acted upon by the heat of the set. In the present instance it is shown as extending into the interior of the superheater. The circuit 21—22 of the pyrometer 20 includes a galvanometer 23 of which the needle 24 is shown as provided with conducting bridges 25 and 26. The movement of the arm 24 and of the bridges 25 and 26 is availed of to reverse the circuit connections of a motor 27 so as to cause the same to turn in either of two directions. The leads 28 and 29 are provided with contacts 30 and 31, and from one pole 32 of the motor there extends a conductor 33 to the part 34 of a contact which consists of the parts 34, 36, and the insulation 35 between them, and there also extends from the pole 32 a conductor 37 which extends to the part 38 of the contact which consists of the parts 38, 39, and the insulation 40 between them. From the other pole 41 the conductor 42 extends to 39 and a conductor 43 extends to 36. When the bridges 25 and 26 are on the contacts and are in the position shown in Fig. 4, the motor circuit is by 29, 30, 26, 39, 42, 41, 32, 33, 34, 25, 31 and 28, and in consequence the motor 27 turns in one direction. When the bridges are in contact with 38 and 36, the circuit is as follows: 29, 30, 26, 38, 37, 32, 41, 43, 36, 25, 31 and 28, and in consequence the motor runs in the other direction. At this point it may be said that the motor and the thermo-pile or couple are an example of one form of control mechanism for automatically varying the quantity of gas making fluid and responsive to heat changes in the apparatus. This form is of course electrical but electrical apparatus generally and the particular kind indicated is descriptive and not intended to limit the invention in the practice of which those skilled in the art can supply without invention suitable gear for working valves in response to temperature changes. The arm 24 normally holds the bridge pieces 25 and 26 clear of the contacts and a time driven shaft having a cam 44 periodically depresses the arm 24 and permits it to rise thus acting as a limit switch to prevent the motor from over-running. If any one desires any further or more specific description of temperature control mechanism one form of such mechanism is described in our application, Serial No. 492,603, filed August 15th, 1921. The motor 27 may work an auxiliary valve 45 on the pressure side of the valve 12 in the generator air connection 5, and the auxiliary valve 45 is of the damper variety and is arranged on the pressure side of the time control apparatus valve 12. The air connection 5 is in excess of the requirements so that when apparatus valve 12 is open and valve 45 partly open, the supply of air can be increased or diminished by the valve 45. In Fig. 1 a valve 45$^a$ and motor 27$^a$ like those described are shown in the carbureter air supply 6 but in practice provision is generally made to open the carbureter valve slowly and to close it rapidly. In Fig. 7 is shown a by-pass 46 with a check valve 47 arranged in the inlet 16, there being a needle valve 48 which controls the inlet and makes it slow whereas the check valve permits of a quick outlet. The needle valve 48 is controlled by a motor 27$^b$ and in this way the motor governs the operation of the air valve 10. In Fig. 8 the motor 27$^c$ controls a valve 49 on the pressure side of the steam valve 11 through the intervention of gearing 50. While we have described the control of the various gas making fluids, it will of course be understood that any one of them can be controlled or more than one can be controlled. The control of the gas making fluids is a means for changing the heat condition in the set. The introduction of less air during the period of the blow fixed by the time control will have a cooling effect and so will the introduction of more steam during the run and the converse of this is true.

It will be obvious to those skilled in the art to which the invention relates that modifications may be made in details of construction, arrangement and form of embodiment without departing from the spirit of the invention which is not limited as to those matters or otherwise than as the prior art and the appended claims may require.

We claim:

1. The combination in an automatic control water gas set of run and blast time control mechanism including valve means for varying the supply of gas making fluids, and thermally responsive provisions adapted to regulate said valve means to maintain predetermined heats.

2. In automatic control water gas sets the combination with time control mechanism normally functioning to actuate the apparatus valves at definite intervals of time for runs and blasts, of temperature control mechanism responsive to heat conditions in the set and adapted to automatically regulate said valve to vary the supply of gas making fluid in order to maintain substantially uniform heats in co-operation with the normal functioning of the time control mechanism and with differing fuel and fire conditions.

3. In a water gas set the combination of valve means for the supply of gas making fluid, time controlled mechanism for opening and closing said valve means at regular intervals of time, and thermally responsive provisions adapted to regulate the opening of said valve means.

4. In a water gas set the combination of an apparatus valve, time control mechanism for the valve, an auxiliary valve arranged in series with the apparatus valve, and temperature control mechanism for the auxiliary valve, substantially as described.

WILLIAM H. GARTLEY.
OWEN B. EVANS.